United States Patent
Patel et al.

(10) Patent No.: US 9,438,054 B2
(45) Date of Patent: Sep. 6, 2016

(54) BATTERY CHARGER INTEGRATED CIRCUIT CHIP

(71) Applicant: Apple Inc., Cupertino, CA (US)

(72) Inventors: Parin Patel, San Francisco, CA (US); Thomas C. Greening, San Jose, CA (US); Carl D. Tappan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 13/875,106

(22) Filed: May 1, 2013

(65) Prior Publication Data

US 2014/0327410 A1 Nov. 6, 2014

(51) Int. Cl.
*H02J 7/00* (2006.01)

(52) U.S. Cl.
CPC ............ *H02J 7/0052* (2013.01); *H02J 7/0003* (2013.01); *H02J 7/0031* (2013.01)

(58) Field of Classification Search
USPC ......................................................... 320/132
See application file for complete search history.

(56) References Cited

U.S. PATENT DOCUMENTS

| | | | |
|---|---|---|---|
| 5,883,497 A | 3/1999 | Turnbull | |
| 5,912,548 A | 6/1999 | Downs et al. | |
| 6,154,012 A | 11/2000 | Drori | |
| 6,456,044 B1* | 9/2002 | Darmawaskita | H02J 7/0052 320/137 |
| 7,755,330 B2 | 7/2010 | Formenti et al. | |
| 2007/0123303 A1* | 5/2007 | Book | H02J 7/0003 455/557 |
| 2009/0273320 A1 | 11/2009 | Ungar et al. | |
| 2011/0050164 A1 | 3/2011 | Partovi et al. | |
| 2012/0181991 A1 | 7/2012 | Gofman | |

FOREIGN PATENT DOCUMENTS

| | | |
|---|---|---|
| EP | 1775654 | 4/2007 |
| EP | 1775654 A1 | 4/2007 |
| EP | 1706929 B1 | 8/2012 |

OTHER PUBLICATIONS

"BA-5590/U", Copyright Brooke Clarke, N6GCE, product information, Internet @ http://www.prc68.com/I/BA5590.shtml [Admitted Prior Art], (19 pages).
"Inner Workings of a Smart Battery", Battery University, Internet article @ http://batteryuniversity.com/learn/article/inner_workings_of_a_sma . . . [Admitted Prior Art], (4 pages).
"Single Cell Li-Ion and Li-Pol Battery Gas Gauge IC for Portable Applications (bqJUNIOR)", Texas Instruments, bq27000, bq27200, SLUS556D—Sep. 2004—Revised Mar. 2006, Internet document at: http://www.ti.com/lit/ds/symlink/bq2000.pdf, (33 pages).
Gunderson, David, "Designing Battery-Management Systems", Micro Power Electronics, EDN, Jan. 6, 2011, (pp. 40-45).
PCT Search Report and Written Opinion (dated Jul. 22, 2014), International Application No. PCT/US2014/033464, International Filing Date—Apr. 9, 2014, (11 pages).
International Preliminary Report on Patentability and Written Opinion, dated Nov. 12, 2015, Application No. PCT/US2014/033464.

* cited by examiner

*Primary Examiner* — Robert Grant
(74) *Attorney, Agent, or Firm* — Blakely, Sokoloff, Taylor & Zafman LLP

(57) ABSTRACT

An on-chip digital communication interface circuit is to be directly coupled to a counterpart interface circuit of a separate battery-side gas gauge circuit. An on-chip battery charging control circuit controls battery charging voltage and current that is supplied from a separate power source interface circuit to a battery cell terminal, according to charging voltage and current limits. The charging limits are read from the gas gauge circuit and in effect carry out a selected one of several different battery charging profiles. Other embodiments are also described and claimed.

17 Claims, 4 Drawing Sheets

BATTERY CHARGER INTEGRATED CIRCUIT CHIP

An embodiment of the invention relates to power management integrated circuits and battery charging circuits, which are to be embedded within portable battery powered consumer electronic devices. Other embodiments are also described.

BACKGROUND

Power management integrated circuits (ICs) have been developed that are to be embedded into portable consumer electronics devices such as smart phones and tablet computers. Different functions have been integrated onto a power management IC chip. For example, high efficiency switch mode battery charger circuitry has been embedded into a power management IC, which interfaces directly with the rechargeable battery of the portable device. The charger circuitry executes constant current/constant voltage charging profiles upon the battery, without requiring interaction with the main processor, so as to efficiently bring the battery up to a state of full charge. On-chip power control or power switching circuitry controls a battery charging current according to a specified constant current (CC) and constant voltage (CV) profile. The IC chip may also have voltage regulator circuitry that provides regulated dc output voltages for use by other active components of the portable device. Digital communication interfaces are also provided that allow battery charging and power management commands to be received from the main processor. The typical power management IC also has an interface to a separate peripheral power source, such as a USB host, from which it draws current to charge the battery and supply its on-board voltage regulators.

Typically, the battery is offered as a battery pack or assembly that contains a battery temperature sensor and a battery gas gauge circuit integrated together with at least one rechargeable electro-chemical battery cell. A separate or dedicated signal wire connects the battery temperature sensor to analog temperature monitoring circuitry within the power management IC, which allows the battery charging control circuitry to automatically avoid overheating the battery during charging at normal temperatures, or charging at low temperatures which may reduce cell life. The charging circuitry in the power management IC directly monitors the battery terminal voltage and the charge current, to implement the set CV and CC charging profile. A single wire digital communications interface (SWI) connects the gas gauge to the main processor, through which the main processor monitors battery voltage, state of charge data, and charge-discharge or usage cycle count received from the gas gauge, in order to compute for example time-to-empty and a measure of the health of the battery.

SUMMARY

An embodiment of the invention is a battery charger IC chip that has an on-chip interface to a separate power source, an on-chip digital communication interface circuit to be directly coupled to a counterpart interface circuit of a separate battery-side gas gauge circuit, and an on-chip battery charging control circuit. The charging control circuit controls the power that is drawn in from the power source interface and that is converted out to a battery cell terminal. The charging control circuit is responsible for controlling the battery voltage and charging current to remain within voltage and current limits set by the gas gauge. The system is therefore capable of implementing a number of different battery charging profiles. This can be achieved by virtue of the charging control circuit being able to, via the digital communication interface circuit, read voltage and current limits from the gas gauge circuit. In addition, since the gas gauge determines the voltage and current limits from the battery's voltage, current, state of charge, temperature, and other parameters, the battery charger is no longer required to know the battery's temperature.

The charger IC thus relies upon the gas gauge circuit to compute multi-dimensional charging profiles, i.e. based on measurements made by the gas gauge circuit of a) real-time or present battery temperature, b) present battery voltage and current, c) battery charge and discharge cycle count, and d) battery state of charge. The gas gauge circuit, which is integrated in a battery pack along with the battery temperature sensor and one or more battery cells, repeatedly and continuously computes updated voltage and current limits and makes them available through its internal registers. The latter are accessible via the digital communication interface of the charger IC chip, and can be periodically read by the charger IC chip in real-time during any given charging cycle. This allows the battery charging control circuitry to continuously modify the present charging profile while complying with the voltage and current limits as indicated in the internal registers of the gas gauge circuit, to efficiently charge the battery in a way that may also help extend battery life and battery capacity, as the battery ages (for example during the normal lifetime of a consumer electronics device in which it is being used).

Additionally, in another embodiment of the invention, the gas gauge benefits from knowing whether the charge current supplied to the battery is being limited by the input current from the power source (e.g., a pluggable dc power adapter) or by the input voltage limits preventing the desired charging power from reaching the battery. This information is sent from the charger IC chip to the gas gauge as a part of each periodic digital transaction with the gas gauge. Informing the gas gauge that the input power is limited allows the gas gauge to make a better-informed determination of the end of charge.

It has been discovered that placing the functionality of repeatedly computing the latest or updated charging profile into the gas gauge circuit, while at the same time making the battery charger IC "dumber" with respect to battery charging capabilities, strikes a particularly useful balance among numerous available options for integrating the different power management functions of particularly smaller or more compact portable electronic devices such as smartphones and tablet computers. That may be due to the desire for housing the gas gauge circuitry, which measures and computes battery energy status and battery health history parameters, with the battery cell within its battery pack. This may enable constantly changing battery health history parameters such as cycle count to remain up to date and easily associated with the pack, as the pack could be disconnected and then moved from one portable device to another.

In one embodiment, to help reduce the number of pins or electrical contacts needed in the electrical connection between the IC chip and the battery, the digital communication interface to the gas gauge circuit may be a single-wire communication interface circuit (SWI), e.g. the HDQ serial data interface. In addition, there is no dedicated temperature signal pin between the battery temperature sensor and the charger IC. This combined approach enables the interface between the charger IC chip and the battery to consist of only three pins, namely an SWI pin, a positive battery power pin, and a negative battery power pin.

The charger chip may also have an on-board voltage regulator that produces a regulated dc voltage for use by other electronic components in the portable device, when the separate pluggable power source (e.g., dc power adapter) is present.

In a further embodiment, the battery charging control circuitry in the charger chip relies on just an on-board state machine, rather than a programmable micro-controller, to periodically read the latest battery voltage and battery current limits from the battery-side gas gauge (over the SWI).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
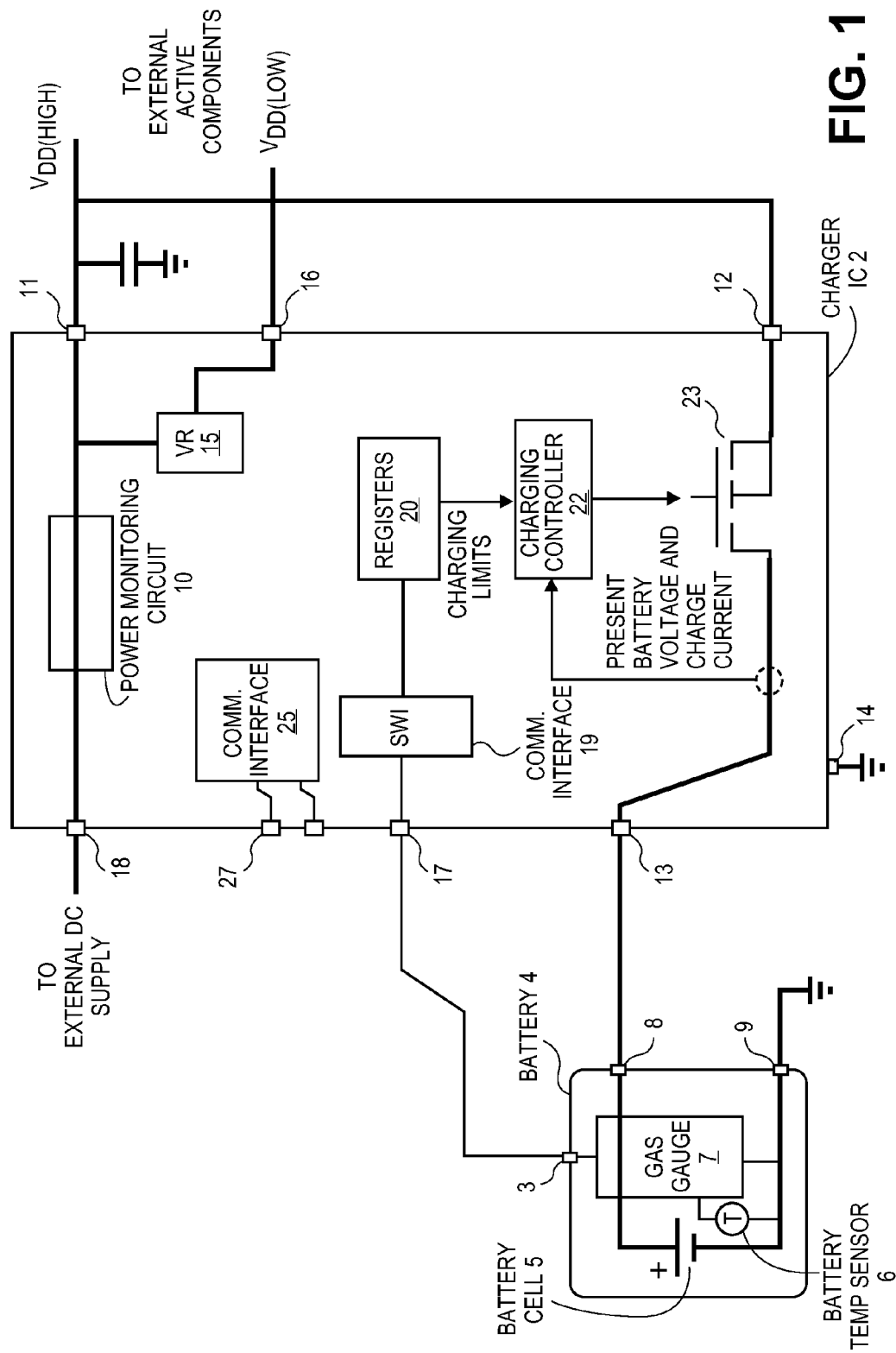
FIG. 1 is combined circuit schematic and block diagram of a combination battery charger integrated circuit chip and battery in accordance with an embodiment of the invention.

FIG. 1 is a combined circuit schematic and block diagram of a battery charger integrated circuit chip and battery combination in accordance with an embodiment of the invention. A charger IC chip 2 is shown as having a number of pins (also referred to as integrated circuit contacts or pads) that are electrically connected with several "external" devices including a battery 4 and a processor (not shown in FIG. 1 but see FIG. 4 described further below). A single wire or trace (that is formed in a printed circuit board or flex circuit carrier, not shown) connects a pin 17 of the IC chip 2 to a pin 3 of the battery 4, while another wire connects a pin 13 of the IC chip 2 to a pin 8 of the battery 4. The latter is the positive cell terminal pin of the battery 4, while another pin 9 is the negative cell terminal pin that is connected to a ground pin 14 of the IC chip 2. This arrangement is a three-pin connection that is sufficient to completely connect the battery 4 to all of its external devices, including the IC chip 2.

The battery 4 may have one or more battery cells 5 (in the example here illustrated as a single battery cell) such as those with conventional electrochemistry, e.g. lithium-polymer chemistry, suitable for use in a relatively small and lightweight portable consumer electronic device such as a smartphone or a tablet computer. A battery temperature sensor 6 is positioned to accurately sense the temperature of the battery cell 5. In addition, the battery 4 includes integrated therein a battery side gas gauge circuit 7. The gas gauge circuit 7 may have a microcontroller and other circuitry therein that enable digitized, accurate measurements of sensed battery temperature, battery cell voltage, and battery cell current, according to known techniques.

The microcontroller in the gas gauge circuit 7 processes in real-time the present sensed battery data, to compute several battery metrics. These include a present state of charge (an indication of current battery capacity remaining), a present or updated battery charging voltage and current limits, present battery voltage, and up to date charge and discharge cycle count. These computed metrics are stored within registers (not shown, but generically referring to any suitable on-chip digital storage circuits that are externally accessible, i.e. from outside of a conventional gas gauge circuit). The gas gauge 7 periodically updates its calculations of such metrics so that the "latest" updates are available in its registers for access by an external device. In this case, access to such registers is via a single wire interface (SWI) that includes a single wire that connects the pin 3 of the battery 4 to the pin 17 of the charger IC 2, using a counterpart digital communication interface 19 in the latter.

In one embodiment, battery charging profiles or algorithms (e.g., constant current, CC, and constant voltage, CV, profiles) are stored and used only in the gas gauge 7, not in the charger IC 2. Only the latest charging voltage and charging current limits are reported to the charger IC 2, by the gas gauge 7 using the on-chip digital communication interface circuit 19 (SWI circuit). In the same vein, the charger IC 2 need not be made aware of the present battery temperature. The latest charging voltage and current limits may be written into or stored within the charger IC 2 in a number of on-chip registers 20, generically referring to on-chip data storage circuits. An on-chip charging controller 22 then controls the present battery voltage and charging current, based on the latest charging voltage and current limits obtained from the gas gauge 7.

In another embodiment, the charger IC 2 may obtain the latest charging profile or algorithm parameters and sensed battery temperature, from the gas gauge 7, by reading them from the gas gauge 7 (via the SWI circuit) and then writing them into the registers 20. In this embodiment, the registers 20 are accessed by the on-chip charging controller 22 which has enhanced functionality that enables it to control the battery voltage and charge current in accordance with the latest charging profile parameters and based on the present battery temperature value.

The charging controller 22 (also referred to as battery charging control circuit) in one embodiment drives a control electrode of a pass transistor circuit 23 (here depicted as a single n-channel field effect transistor whose gate electrode is driven by the controller 22). This results in a controlled amount of charge current being drawn from a separate power source, via an on-chip power source interface circuit that includes pins 18, 11 and the electrical connection there between. In this example, an external wire trace, which may encompass multiple wire traces connected in parallel to reduce series resistance, connects pin 12 to pin 11 which is labeled as V"$_{high}$) and through which the charge current passes. The charge current is directed to a cell terminal of the battery cell 5 by virtue of an output of the pass transistor circuit 23 being coupled to a battery cell terminal pin (or battery power pin) 8 through the pin 13 of the charger IC 2. The pass transistor circuit 23 may be assisted by one or more additional off-chip pass transistors that are connected in parallel (not shown) to the pins 12, 13 of the IC chip 2. In that case, an additional pin (not shown) is needed that allows a connection to the output node of the charging controller 22, in order to drive the control electrode of the off-chip pass transistor. In one embodiment, this results in power from a higher voltage, pluggable DC power source to be converted into a lower voltage and used for charging the battery 4.

Note that the pass transistor 23 will also pass a discharge current in the reverse direction, that is from pin 13 to pin 12, when the separate pluggable power source (external DC supply connected to pin 18) is disconnected, or when the power required by external active electronic components in the portable device exceeds that available from the separate pluggable power source, so that the battery 4 can provide power supply current to the V$_{dd(high)}$ rail.

The pass transistor circuit 23 has an input through pin 12 of the charger IC 2 that is coupled to the separate power source interface circuit. The separate power source interface circuit may include a power monitoring circuit 10, in addition to protection devices (not shown) such as over voltage protection devices. The separate power source interface circuit includes pin 18 which is connected to a separate dc supply (not shown) that may be, for example, a pluggable peripheral device, such as a universal serial bus (USB) host to which the portable device in which the charger IC 2 is integrated is coupled. More on this can be found in FIG. 4 described below.

The charging controller 22 obtains a measure of the present battery voltage and present charge current through circuitry depicted in dotted lines that may include a current sense circuit to sense the charge current that is directed to the cell terminal pin 8. The battery voltage and battery charge current thus sensed, together with the latest charging voltage and current limits, are used by the charge controller 22 to, in this example, rapidly switch on and switch off the pass transistor circuit 23 so as to keep the measured battery voltage and battery current within the limits determined by the gas gauge 7. The charging controller 22 may continually control the battery voltage and charge current during a charge cycle, by periodically reading the charging voltage and current limits from the registers 20 which in turn are periodically written to by the communication interface 19 following a readout from the gas gauge 7. In this manner, the charging controller 22 can implement multiple, different battery charging profiles during any given charge cycle, where these charging profiles were computed by the microcontroller in the gas gauge 7 so as to provide an "optimum" charging profile in view of the present health or age of the battery (for example measured in terms of charge and discharge cycle count) and the present sensed battery temperature.

Examples of charging profiles include constant voltage (CV) and constant currant (CC) battery charging profiles whose parameters or thresholds may include the initial constant current level at the start of a charge cycle, a constant battery cell voltage to be maintained during the charge cycle, and a termination constant voltage (that is to be sought at the end of the charge cycle). More complex charging profiles may be defined that, for example, include changes or steps in the decrease in the charging current, depending upon the present sensed battery temperature and the accumulated cycle count. See for example battery charging profiles described in U.S. Patent Application Publication No. 2009/0273320 A1 of Ungar, et al., in which various charging processes for a particular type of rechargeable battery (one having a lithium polymer chemistry) have been described. Note that in general, any known or suitable charging profiles may be used, where it is understood that the microcontroller in the gas gauge 7 can be programmed to compute the needed battery voltage and charge current limits for such profiles, in accordance with any known or suitable techniques. An example is adaptive surface concentration charging (ASCC) which helps avoid lithium surface saturation during the charging process of lithium polymer batteries.

It should be noted that as depicted in FIG. 1, the gas gauge 7 may be viewed as in effect sending battery charging profile selection commands to the charging controller 22 (via the SWI), such that this aspect of the charger IC 2 may be considered less complicated or "dumber" than the gas gauge 7. This trade off is likely to be particularly effective in relatively small portable consumer electronic devices, such as smartphones and tablet computers, because it also allows fewer pin count for the flex or printed circuit board connection between the battery 4 and the charger IC 2, while at the same time leveraging the availability of a microcontroller in the gas gauge 7. In such an embodiment, the charging controller 22 may be advantageously implemented using relatively less complex logic circuitry that implements a state machine, so that no programmable microcontroller is needed for the charging control aspect within the charger IC 2.

Still referring to FIG. 1, additional components of the charger IC 2 may include a voltage regulator (VR) 15, which may be an on-chip switch mode voltage regulator circuit that provides a lower dc regulated voltage at pin 16 of the charger IC 2, drawing current from pin 18 (and from the separate dc supply). Thus, the separate pluggable power source (not shown) is used to provide two power supply rail voltages, namely V$_{dd(high)}$ and V$_{dd(low)}$. Those power supply voltages may be used to power separate components within the portable device (again as further described below in connection with FIG. 4).

FIG. 1 also shows an embodiment where the charger IC 2 has a further on-chip digital communication interface circuit 25. This may be, for example, in accordance with any known conventional chip-to-chip interconnect interface technique, such as I2C, which is a two-wire, multi-master serial single ended computer bus interface. This is a more complex interface than the communications interface 19 (SWI), and may be used for receiving commands from a separate processor (e.g., the processor 39 depicted in FIG. 4), including commands relating to power management such as a power down command that shuts down the charging controller 22 and the VR 15, imposing a charging current limit that is smaller than that received from the gas gauge circuit 7 and is stored in the registers 20 for purposes of limiting the thermal envelope of the portable electronic device, and for reading power measurements from the power monitoring circuit 10 which indicate the total power consumption of the portable device at any given moment.

Figure 2:
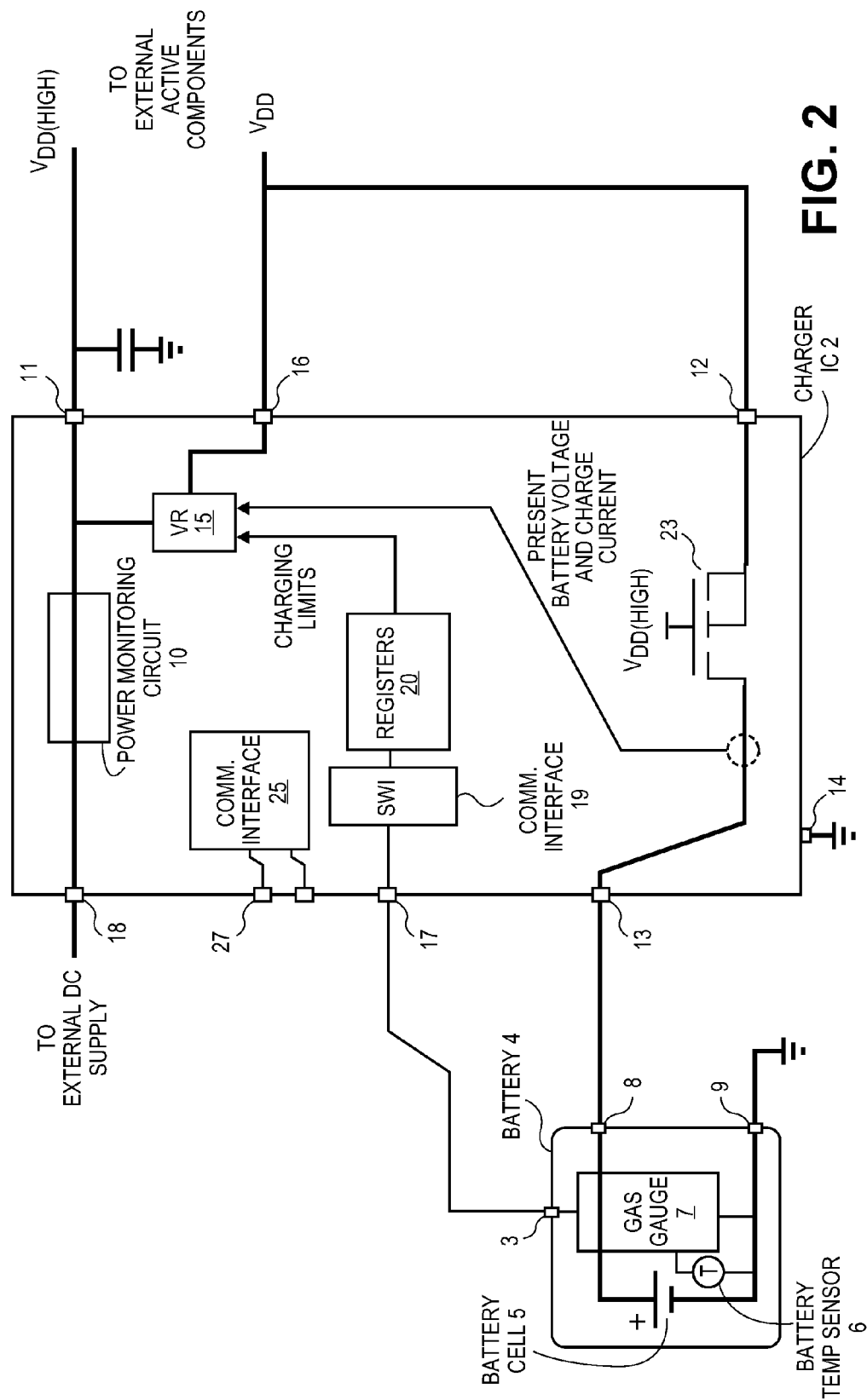
FIG. 2 is a circuit schematic of another embodiment of the invention.

As described above in connection with FIG. 1, the charger IC 2 includes a battery charging circuit or charging controller 22 that can in essence be configured with a selected one of several battery charging profiles, in effect by the battery-side gas gauge circuit 7. The latter continually computes, desired or updated charging voltage and current limits based on the present battery temperature that it senses, based on the present usage cycle count that it has accumulated, and also based on the present battery voltage that it senses, and then signals the computed parameters to the charging controller 22, in response to periodic read requests received from the charger IC 2 over the SWI (pins 3, 17, and the communication interface circuit 19). In FIG. 1, the charging controller 22 was depicted as a separate component than the VR 15, where the latter produces a regulated voltage on pin 16 ($V_{dd}$). In that case, the input of the pass transistor 23 at pin 12 of the charger IC 2 is directly connected to pin 11 of the charger IC 2 on which the greater dc supply voltage $V_{dd(high)}$ is found (sourced from the separate dc supply). FIG. 2 shows an alternative arrangement where the charging controller 22 is embedded or part of a switching power supply controller that is shared by or deemed a part of the VR 15. Thus, the updated charging voltage and current limits are provided from the registers 20 directly to the controller logic of the VR 15. The VR 15, and in particular its embedded power switching controller logic, provides the needed voltage at pin 16, which is directly connected in this case to pin 12 where the latter is the input to the pass transistor circuit 23, where the battery voltage at pin 13 and the charging current through the pass transistor circuit 23 are limited to the gas gauge-provided charging voltage and current limits In this case, the pass transistor circuit 23 may be biased always-on as shown (with the electrode directly pulled to $V_{dd(high)}$ in the case of an n-channel field effect transistor), or may alternatively be biased in a linear mode to maintain the voltage at pin 16 to minimum level without exceeding the desired voltage and current limits at pin 12.

Figure 3:
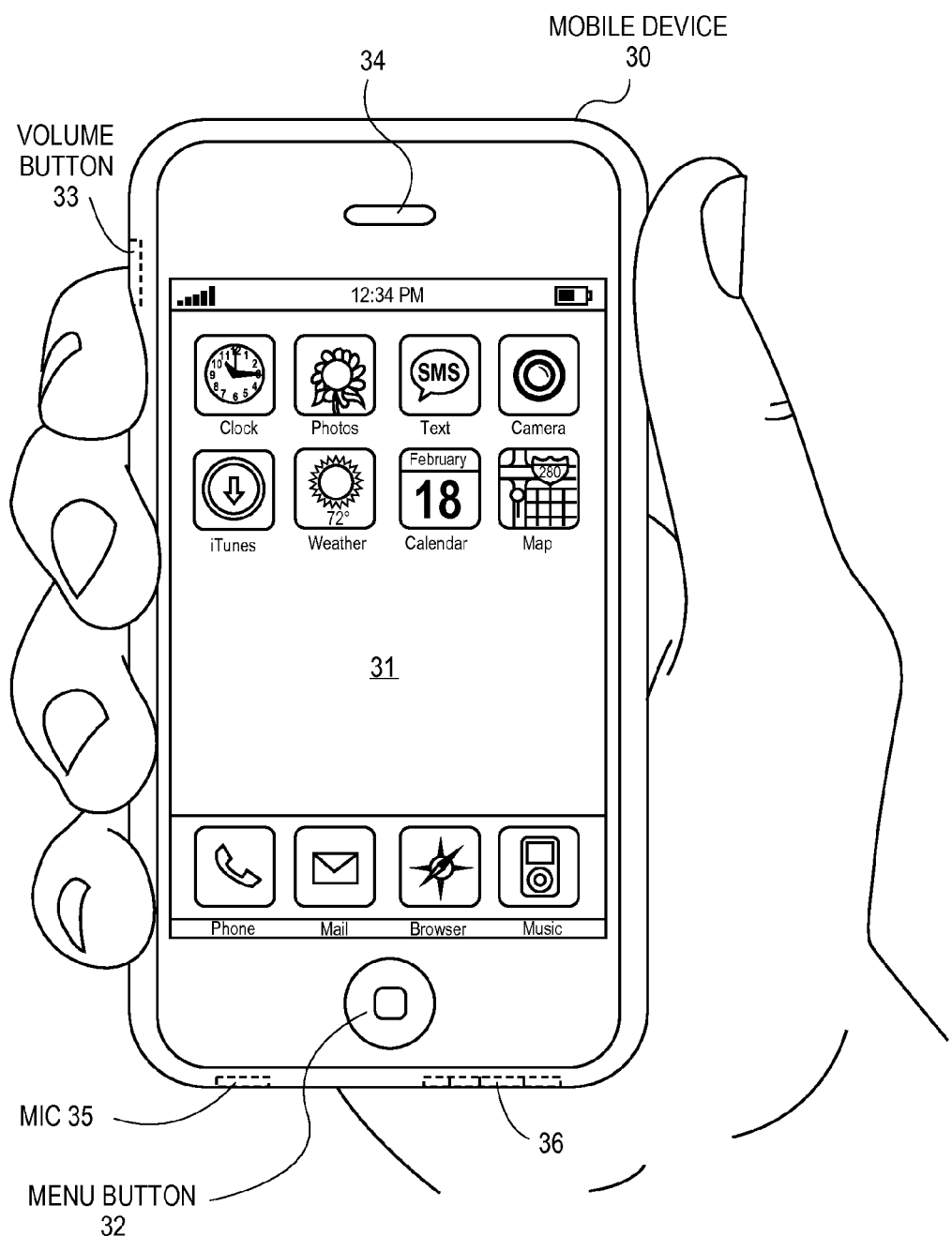
FIG. 3 illustrates an example portable electronic device in which a combination battery charger IC chip and battery may be used.
Figure 4:
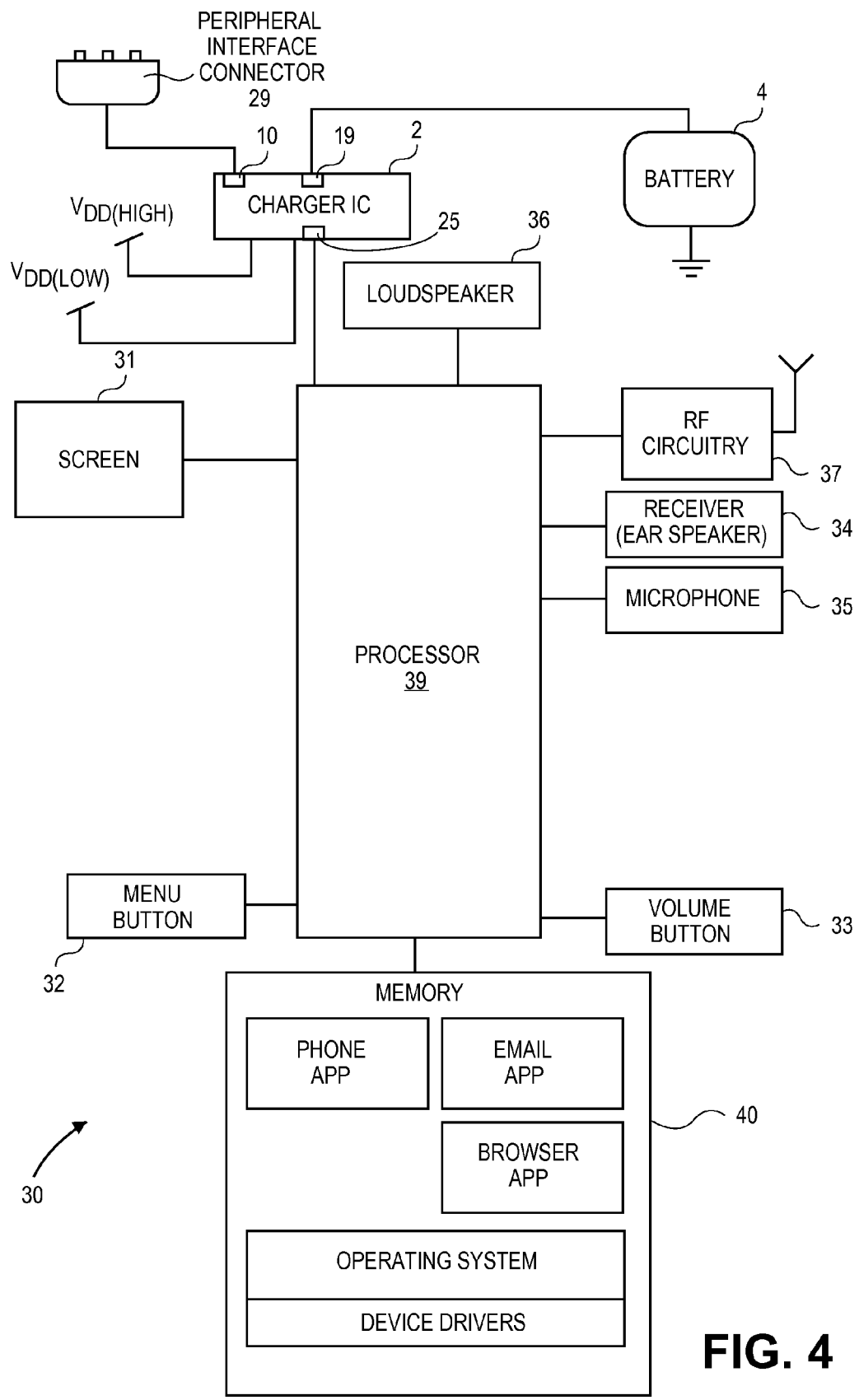
FIG. 4 is a block diagram of the portable electronic device of FIG. 3.

FIG. 3 illustrates an example portable electronic device in which a combination battery charger IC chip and battery may be used, being a mobile communications device 30 (also referred to here as a smartphone). FIG. 4 is a block diagram of such a portable device. The mobile device 30 may be an iPhone™ device by Apple Inc. of Cupertino, Calif. Alternatively, it could be any other portable handheld multi-function communications device or smart phone that has a touchscreen 31 (or alternatively a display screen and another form of manual user data input device such as a keyboard and a mouse). The device 30 has a number of capabilities to enable its user (whose hand is shown holding the external housing of the device 30 in FIG. 3), to access functions such as telephony (voice or video) calls, voice or video mail, and text messaging. The device 200 includes various capabilities to enable the user to access features involving, for example, calls, text messages, voicemail, e-mail, the Internet, scheduling, photos, and music as shown on the display screen 230. Icons representing such apps may appear on a main menu as shown on the screen 31.

The external housing of the mobile device 30 may have integrated therein a microphone 35 for picking up the voice of its user during a call or recording session, and an earpiece speaker (receiver) 34 for delivering the voice of the far-end user during the call directly up against the near-end user's ear. A physical volume button 33 may be provided to all the near end user to manually set sound volume emitted from the earpiece speaker 34. A separate, physical menu button 32 allows the user to return a graphical user interface running in the device 30 to a main menu as shown, from anywhere within a hierarchical menu tree. The device 30 may also have a speaker phone loudspeaker 36, for stronger sound emission. Other conventional features such as a power on/off button and an accessory connector (e.g., headphone jack) are not shown but may of course be included as well.

FIG. 4 depicts a block diagram of certain electrical components of the mobile device 30. The device 30 has a processor 39 that executes instructions to carry out the different functions of the device 30 introduced above. The instructions may be retrieved from local memory 40, and may be in the form of an operating system program (with device drivers) and one or more application programs (apps) that are said to run on top of the operating system, to perform the different functions introduced above (e.g., phone or telephony, e-mail, and Internet browsing). The latter may be achieved using a wireless link enabled by RF circuitry 37 and its associated RF antenna, to yield a wireless local area network (WLAN) link to a nearby WLAN access point for example, or a cellular data link to a cellular telephone communications network base station.

As seen in FIG. 4, the mobile device 30 has integrated within its external housing the battery 4 that is connected to the communications interface 19 of the charger IC 2. The latter is also connected, via its on-chip power interface that includes the power monitoring circuit 10, to a computer peripheral interface connector 29 that allows a pluggable connection with a separate power source, e.g. a USB compatible host such as an AC wall power adapter or a laptop or desktop computer for example. The connection to the processor 39 is via the on-chip communications interface 25 (e.g., an I2C interface circuit). Power supply voltages $V_{dd(high)}$ and $V_{dd}$ are available from the charger IC 2, to power most of the components of the device 30 shown in the block diagram.

A method performed by an IC chip in a portable electronic device or system, for charging a battery of the device may proceed as follows. An on-chip controller accesses a charging voltage and current limit register that is in direct digital communication with a battery-side gas gauge circuit. The register contains the latest charging voltage and current limits produced by the gas gauge circuit. Power from a separate power source, i.e. external to the portable device, is used to power the system, and to provide charging power to the cell terminal of a battery. The charging voltage and current is controlled in accordance with the latest battery charging voltage and current limits that are obtained from the gas gauge and can be accessed through the on-chip register. The charging voltage and current limits can be adjusted during a given charge cycle, in accordance with multiple, different battery charging profiles that have been computed by the gas gauge circuit (and that have been accessed via the on-chip registers). Each of the profiles may yield a different battery cell voltage curve vs. time or battery cell charge current vs. time, while charging the battery, where the profiles are selected by the gas gauge circuit in order to extend battery life.

The gas gauge circuit continually senses present battery temperature, present battery voltage and present battery current, and on that basis maintains an accumulating count of battery charge and discharge cycles. It also continually computes new charging voltage and current limits, based on a) the charge and discharge cycles count, b) present sensed battery temperature, c) present sensed battery voltage, and d) the state of charge. The charger IC chip periodically reads the limits from the gas gauge circuit for use by the on-chip battery charging controller.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the pass transistor circuit 23 is shown as a single insulated gate field effect transistor in FIG. 1 and FIG. 2, an alternative is a more complicated multi transistor circuit that can be operated in a switching mode, a linear mode, or in an "always-on" mode (depending upon the nature of the battery charging controller 22). The description is thus to be regarded as illustrative instead of limiting.

What is claimed is:

1. An integrated circuit (IC) chip comprising:
   an on-chip power source interface to obtain power from a separate power source;
   a digital single wire communication interface circuit on-chip with the power source interface and to be directly coupled to a counterpart interface circuit of a separate battery-side gas gauge circuit that is external to the IC chip; and
   a battery charging control circuit on-chip with the power source interface and the digital single wire communication interface circuit to control battery charging voltage and current at a battery cell terminal, using power that is supplied by the power source interface,
   the battery charging control circuit being coupled to the digital single wire communication interface circuit to read battery charging voltage and current limits from the gas gauge circuit that is external to the IC chip, and to use-control the charging of a battery in accordance with the battery charging voltage and current limits that have been read from the gas gauge circuit.

2. The IC chip of claim 1 further comprising on-chip registers that store the read battery voltage and current limits.

3. The IC chip of claim 1 further comprising a pass transistor circuit whose input is coupled to the power source interface and whose output is coupled to a battery terminal connection pin of the IC chip, wherein the battery charging control circuit is coupled to a control electrode of the pass transistor.

4. The IC chip of claim 1 further comprising an on-chip voltage regulator a) having an input coupled to the power source interface from which the regulator is to produce a regulated dc voltage and b) that is to supply power to external components.

5. The IC chip of claim 4 further comprising a pass transistor circuit whose input is coupled to the power source interface and whose output is coupled to a battery terminal connection pin of the IC chip, wherein the pass transistor circuit is biased continuously on during charging.

6. The IC chip of claim 1 comprising a further an on-chip digital communication interface circuit to be accessed by a separate processor.

7. The IC chip of claim 1 in combination with the separate battery side gas gauge circuit, wherein the battery charging control circuit is to be configured to control the charging of the battery in accordance with a selected one of a plurality of different battery charging profiles that is selected by the separate battery side gas gauge circuit, wherein the gas gauge circuit is to compute charging voltage and current limits based on present battery temperature, present usage cycle count, present battery voltage, and present battery state of charge determined by the gas gauge circuit itself, and to signal the computed charging voltage and current limits to the battery charging control circuit in response to periodic read requests received from the IC chip.

8. A portable electronic device comprising:
   a battery having a battery cell, a battery temperature sensor and a battery-side gas gauge circuit;
   a display screen;
   a processor;
   memory having stored therein an operating system and a plurality of application programs for execution by the processor;
   a computer peripheral interface connector to connect with a separate pluggable power source; and
   an integrated circuit (IC) chip that comprises an on-chip interface to the connector, an on-chip digital single wire communication interface circuit that is directly coupled to a counterpart interface circuit in the gas gauge circuit, and an on-chip battery charging control circuit to control battery charging voltage and current that is drawn in from the connector and that is directed to a terminal of the battery cell,
   the battery charging control circuit a) being coupled to the digital single wire communication interface circuit to read charging voltage and current limits from the gas gauge circuit, and b) to use the read charging voltage and current limits to charge the battery cell according to a selected one of a plurality of different battery charging profiles that is selected by the gas gauge circuit.

9. The device of claim 8 wherein the on-chip interface to the connector has an input pin that is coupled to an output pin through a low impedance path,
   and wherein the device further comprises a pass transistor circuit whose input is coupled to the output pin of the IC chip and whose output is coupled to the battery cell terminal, wherein the battery charging control circuit is coupled to a control electrode of the pass transistor circuit.

10. The device of claim 8 wherein the IC chip further comprises an on-chip voltage regulator a) having an input coupled to the connector from which the regulator is to produce a regulated dc voltage and b) that is to supply power to other components in the device.

11. The device of claim 8 wherein the IC chip comprises a further on-chip digital communication interface circuit for access by the processor.

12. The device of claim 8 wherein the battery side gas gauge circuit is to repeatedly compute charging voltage and current limits based on on-going measurements of present battery temperature, present usage cycle count, present battery voltage, and battery state of charge, and to signal the computed charging limits to the battery charging control circuit via the on-chip digital single wire communication interface circuit in response to periodic read requests received from the IC chip.

13. A method performed by an integrated circuit (IC) chip in a portable electronic device for charging a battery of the device, comprising:
   accessing an on-chip battery charging limit register that is in direct digital communication, through a single wire communication interface, with a battery-side gas gauge circuit that is external to the IC chip, wherein the register contains the latest battery charging voltage and battery charging current limits that have been produced by the gas gauge circuit and obtained through the single wire communication interface; and controlling a battery charging current and a battery cell voltage, using power that is drawn in from a separate power source and that is directed to a cell terminal of the battery, in accordance with one of a plurality of different battery charging profiles that is specified by the gas gauge circuit.

14. The method of claim 13 wherein each of the plurality of different battery charging profiles yields a different battery cell voltage curve vs. time or battery cell charge current vs. time, while charging the battery.

15. The method of claim 13 in combination with the following operations performed by the battery-side gas gauge circuit:

continually sensing present battery temperature, battery voltage and battery current;

maintaining a count of battery charge and discharge cycles; and continually computing new battery charging voltage and battery charging current limits that correspond to the specified one of the different battery charging profiles, based on a) the charge and discharge cycles count, b) present sensed battery temperature c) present sensed battery voltage and d) the battery state of charge.

16. The method of claim 15 further comprising the following operations by the IC chip:

repeatedly reading from the gas gauge circuit, via the single wire communication interface, the computed, new battery charging voltage and battery charging current limits and storing them in the on-chip register as the latest battery charging voltage and battery charging current limits.

17. The method of claim 13 further comprising the following operation by the IC chip:

repeatedly reading from the gas gauge circuit via the single wire communication interface the latest battery charging voltage and battery charging current limits that have been produced by the gas gauge circuit, and storing them in the on-chip register.

* * * * *